US006224795B1

(12) United States Patent
Frank et al.

(10) Patent No.: US 6,224,795 B1
(45) Date of Patent: May 1, 2001

(54) LOW-FORMALDEHYDE DISPERSION OF MICROCAPSULES OF MELAMINE-FORMALDEHYDE RESINS

(75) Inventors: Gabriele Frank, Mannheim; Ralf Biastoch, Speyer, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/360,452

(22) Filed: Jul. 26, 1999

(30) Foreign Application Priority Data

Jul. 24, 1998 (DE) ............................................. 198 33 347

(51) Int. Cl.[7] .............................. B01J 13/02; B01J 13/04; B01J 13/20; B01J 13/22; B05D 7/00
(52) U.S. Cl. .......................... 264/4.1; 264/4.3; 264/4.33; 264/4.7; 427/213.3; 427/213.31; 427/213.33; 427/213.34; 428/402.2; 428/402.21
(58) Field of Search ........................... 264/4.1, 4.3, 4.33, 264/4.7; 427/213.3, 213.31, 213.33, 213.34; 428/402.2, 402.21

(56) References Cited

U.S. PATENT DOCUMENTS

| 4,406,816 | 9/1983 | Sliwka . |
|---|---|---|
| 4,880,721 | 11/1989 | Ishikawa . |
| 4,898,696 | 2/1990 | Sliwka . |
| 4,918,317 | 4/1990 | Hess et al. . |
| 4,963,461 | * 10/1990 | Takahashi et al. .................. 430/138 |

FOREIGN PATENT DOCUMENTS

| 38 14 250 | 11/1988 | (DE) . |
|---|---|---|
| 0 026 914 | 4/1981 | (EP) . |
| 0 218 887 | 4/1987 | (EP) . |
| 0 319 337 | 6/1989 | (EP) . |
| 0 383 358 | 8/1990 | (EP) . |

* cited by examiner

Primary Examiner—Nathan M. Nutter
(74) Attorney, Agent, or Firm—Oblon, Spivak, McClelland, Maier & Neustadt, P.C.

(57) ABSTRACT

A process for the preparation of microcapsules by the condensation of melamine-formaldehyde resins and/or the methyl ethers thereof in water, in which the substantially water-insoluble material forming the core of the capsule is dispersed, in the presence of an anionic protective colloid at pH's of from 3 to 6.5 by the formation of the microcapsules at temperatures of from 20° to 50° C. followed by curing of the shell of the capsules at from >50° to 100° C., in which, prior to curing, from 10 to 200 wt % of urea, whose amino groups are optionally linked to an ethylene or propylene bridge, based on the melamine-formaldehyde resin are added, the microcapsules produced by this process and also the use thereof in a pressure-sensitive recording system.

11 Claims, No Drawings

LOW-FORMALDEHYDE DISPERSION OF MICROCAPSULES OF MELAMINE-FORMALDEHYDE RESINS

BACKGROUND OF THE INVENTION

FIELD OF THE INVENTION

The present invention relates to a process for the preparation of microcapsules by the condensation of melamine-formaldehyde resins and/or the methyl ethers thereof in water, in which the substantially water-insoluble material forming the core of the capsules is dispersed, in the presence of an anionic protective colloid at pH's ranging from 3 to 6.5 by the formation of the microcapsules at temperatures ranging from 20° to 50° C. followed by curing of the shell of the capsules at from >50 to 100° C. It also relates to the microcapsules produced by the process and to the use thereof in pressure-sensitive recording systems.

DISCUSSION OF THE BACKGROUND

EP-A 0-383 358 and DE-A 3,814,250 teach light-sensitive materials comprising microcapsules whose walls are composed of a melamine-formaldehyde resin. In order to remove the excess formaldehyde, urea is added during curing, which takes place from pH 5.5 and 60° C. upwards.

Urea is likewise added in the processes that are described in EP-A 319,337 and U.S. Pat. No. 4,918,317, toward the end of curing.

Microcapsules of melamine-formaldehyde resins which are distinguished by uniform size and impermeabity of the capsules, are disclosed in EP-A 0,026,914 and EP-A 0,218,887. The capsule dispersions produced by this process still contain residual free formaldehyde, the presence of which is undesirable during subsequent processing. EP-A 0,026,914 therefore recommends binding the formaldehyde subsequently to curing with imidazolidin-2-one and/or melamine acting as formaldehyde scavengers. This makes it possible to lower the formaldehyde content of the dispersion but has no influence on the formaldehyde that is liberated during subsequent processing or on the formaldehyde content of the coated papers. Attention should also be drawn to the fact that the addition of imidazolidin-2-one acting as formaldehyde scavenger has no influence on the shell of the microcapsules that are already formed.

SUMMARY OF THE INVENTION

It is thus an object of the present invention to provide a process for the preparation of low-formaldehyde dispersions of microcapsules which avoids the aforementioned drawbacks. In particular, the novel dispersions of microcapsules should emit distinctly less formaldehyde during manufacture and subsequent processing thereof, as also applies to the recording systems, and should nevertheless exhibit good performance properties. Such demands include, for example, impermeability of the shell of the capsule and narrow size distribution of the capsules.

Accordingly, we have found a process for the preparation of microcapsules by the condensation of melamine-formaldehyde resins and/or the methyl ethers thereof in water, in which the substantially water-insoluble material forming the core of the capsule is dispersed, in the presence of an anionic protective colloid at pH's ranging from 3 to 6.5 by the formation of the microcapsules at temperatures ranging from 20° to 50° C. followed by curing of the shell of the capsule at from >50 to 100° C., in which from 10 to 200 wt % of urea, whose amino groups are optionally linked to an ethylene or propylene bridge, based on the weight of melamine-formaldehyde resin, are added prior to curing. The percentage is based on the content of resin and not on its aqueous solution, in which it is usually employed.

DETAILED DESCRIPTION OF THE INVENTION

The process of the invention is generally carried out by finely emulsifying the core material to be encapsulated in an aqueous solution of the anionic protective colloid having a pH from 3 to 6.5, and the drop size can be adjusted depending on the final usage of the capsules. The aqueous solution of the melamine-formaldehyde resin and/or the methyl ethers thereof is added continuously or portionwise to the emulsion used as initial batch at temperatures ranging from 20° to 45° C. with stirring.

The microcapsules form in this first step. The shell thereof is then cured by raising the temperature. Curing of the shell of the capsule is found to take place from 50° C. upwards, so that >50° C., preferably 55° C. and more preferably 65° C. is used as the lower limit of the temperature range. Because it is an aqueous dispersion, curing should be carried out up to 100° C. and preferably up to 80° C. as the upper temperature limit. Depending on the pH of the dispersion, curing takes place at different rates, with dispersions having lower pH's between 3 and 5 optimally curing at temperatures ranging from 65° to 85° C. However above 50° C. curing is also clearly apparent in the weakly acid to neutral pH range.

The optimum temperatures with respect to the pH for the two steps capsule formation and curing can be readily determined by simple routine tests. An essential feature is that the urea and/or its cyclic derivatives are added prior to the curing step. This can be at the stage of preparing the emulsion of the core material or before or after the formation of the dispersion of microcapsules. The urea solutions are advantageously metered in together with the aqueous solution of the anionic protective colloid or preferably with the solution of the melamine-formaldehyde resin.

In addition to urea, which is preferably used, imidazolidin-2-one or tetrahydro-2-pyrimidone can be used.

Preferably from 50 to 150 wt % of urea, imidazolidin-2-one and/or tetrahydro-2-pyrimidone, based on the weight of melamine resin, are added prior to curing.

Suitable starting materials for the shell material are melamine-formaldehyde resins and/or the methyl ethers thereof, the ratio of melamine to formaldehyde being from 1:1.5 to 1:6, preferably from 1:3 to 1:6. These resins are N-methylolmelamine compounds or the methyl ethers thereof. The resins used in the process of the invention have to be miscible with water in all proportions without causing turbidity. For these reasons the ethers of methylolmelamines are particularly preferred. Methods of preparing the starting materials are known. Condensation of the resins takes place at pH's of from 3.0 to 6.5 and preferably from 3.5 to 5.5. The pH in the aqueous phase can be adjusted by adding acids, preferably formic acid. The method of precipitating the melamine-formaldehyde resin is somewhat dependent on the resin, so that there are somewhat different optimal pH's and/or temperatures for the formation of the microcapsules from the various resins.

Suitable core materials for the microcapsules are liquid, solid or gaseous, water-insoluble to substantially undissolved substances, and the following may be mentioned by way of example: liquids such as alkylnaphthalenes, partially hydrogenated terphenyls, aromatics such as xylene, toluene, dodecylbenzene, aliphatic hydrocarbons, such as gasoline and mineral oil, chlorinated paraffins, fluorocarbons, naturally occurring oils such as peanut oil, soybean oil, in addition adhesives, flavors, perfume oils, monomers such as (meth)acrylates, styrene, active substances such as agricultural pesticides, red phosphorus, inorganic and organic pigments, such as iron oxide pigments; in addition solutions or suspensions of colorants and primarily color formers and pigments in hydrocarbons such as alkylnaphthalenes, partially hydrogenated terphenyl, dodecylbenzene and other high-boiling liquids. The anionic protective colloids used are preferably water-soluble homopolymers or copolymers containing sulfo groups.

Suitable anionic protective colloids are preferably water soluble homopolymers or copolymers containing sulfo groups. Preference is given to homopolymers or copolymers containing sulfo groups which have a Fikentscher K value of from 100 to 170 or a viscosity of from 200 to 5000 mpa•s (measured on a 20 wt % strength aqueous solution at 23° C. using a Brookfield viscosimeter RVT, spindle No. 3, at 50 rpm).

Polymers having a K value of from 115 to 150 or a viscosity of from 400 to 4000 mpa•s are preferred. Such protective colloids are described in EP-A 0,026,914 and EP-A 0,562,344.

Polymers of sulfoethyl (meth)acrylate, sulfopropyl (meth)acrylate, vinylsulfonic acid and 2-acrylamido-2-methylpropanesulfonic acid are advantageous either alone as homopolymers or intermixed as copolymers. Polymers of 2-acrylamido-2-methylpropanesulfonic acid are preferred, since microcapsules having very good properties are formed in the presence thereof. 2-Acrylamido-2-methylpropanesulfonic acid also has the advantage that this can be readily polymerized to give polymers having the desired K values. The polymers exist in the form of the free acids or preferably in the form of the alkali metal salts. Other suitable sulfo group-containing polymers are copolymers which are composed of the said sulfo group-containing monomers and $C_1$–$C_3$ alkyl acrylates, hydroxy-($C_2$–$C_4$ alkyl) acrylates such as methyl-, ethyl-, n- or isopropyl acrylate, hydroxypropyl acrylate and/or N-vinylpyrrolidone. Copolymers of 2-acrylamido-2-methylpropanesulfonic acid, sulfoethyl or sulfopropyl (meth)acrylate or vinylsulfonic acid are described in EP-A 0,562,344, which is included herein by reference.

Particularly preferred protective colloids are, according to this reference, copolymers of 40 to 75 wt % of 2-acrylamido-2-methylpropanesulfonic acid, sulfoethyl or sulfopropyl (meth)acrylate or vinylsulfonic acid 10 to 30 wt % of acrylic acid or methacrylic acid, 10 to 50 wt % of methyl or ethyl (meth)acrylate or N-vinylpyrrolidone and 0.5 to 5 wt % of styrene, $C_4$–$C_{18}$ alkyl (meth)acrylate Of the copolymers, those having 2-acrylamido-2-methylpropanesulfonic acid as sulfo group-containing comonomer are preferred.

The sulfo group-containing homopolymers and copolymers are prepared by known methods.

The amount of the water-soluble, sulfo group-containing polymers used is usually between 1 and 5.5 wt % and preferably between 1.5 and 4.5 wt %, based on the aqueous phase. The optimal quantity of the water-soluble sulfo group-containing polymer is influenced on the one hand by the polymer itself and on the other hand by the reaction temperature, the desired microcapsule size and the melamine/formaldehyde resin. The optimum quantity of the water-soluble polymer required can be readily determined by simple routine tests.

Dispersal of the core material is carried out in known manner depending on the size of the capsules to be synthesized. For preparation of large capsules it is sufficient to effect dispersal using active stirrers, particularly propeller or impeller agitators. Small capsules, particularly if the size is to be below 50 µm, require homogenizing or dispersing machines, where these devices may or may not have forced-flow means.

The size of the capsules can be controlled within certain limits by varying the speed of rotation of the dispersing/homogenizing device and/or by varying the concentration of the sulfo group-containing polymer or by regulating the molecular weight thereof, ie by varying the viscosity of the aqueous continuous phase. The size of the dispersed particles decreases with an increase in the speed of rotation, up to a certain rotary speed limit.

It is important that the dispersing devices be used at the commencement of capsule formation. In the case of continuous forced-flow devices it is advantageous to pass the emulsion through the shearing zone a number of times.

The conditions, such as temperature, pH and stirring rate, that are best for each individual case can be readily determined by making a few tests.

In the process of the invention, dispersions of microcapsules having a content of microcapsules of from 15 to 60 wt % can be prepared. The microcapsules are discrete capsules. By selecting suitable conditions for dispersal, capsules having diameters in the range of from 1 to 50 µm and more can be prepared. The very narrow size distribution of the capsules is a particularly advantageous feature. This also applies to the range of from 1 to ca 8 µm which is particularly suitable for manufacture of pressure-sensitive recording systems and reaction copying papers. The capsules produced by the process of the present invention are therefore also suitable for preparation of dual-layer papers ("self-contained papers") in which the color formers in capsules and the electron acceptor required for color formation are applied to the surface of the paper either as superimposed layers or in the form of a mixture.

The capsule dispersions are of very low viscosity despite the high concentration of capsules and the high molecular weight of the water-soluble, sulfo group-containing polymers and are therefore filterable at a high rate through Fourdrinier wires having a mesh size of from 25 to 40 µm. Filtration shows that the yield of microcapsules in the process of the invention is very high and is more than 98% in most cases.

These novel dispersions of microcapsules have an extremely low formaldehyde content. However, a particularly astonishing feature is the fact that the formaldehyde content is also low in the coated papers.

This is explained by the fact that the liberated formaldehyde presumably reacts with the urea and is incorporated in the shell of the capsule, since microcapsules having other properties such as thicker capsule shells are obtained. This novel encapsulating process makes it possible to lower the content of melamine-formaldehyde resin based on the weight of core material. Those microcapsules produced by the process of the invention are preferred which comprise

| | |
|---|---|
| 7 to 20 wt % | of melamine-formaldehyde resin and/or the methyl ethers thereof and |
| 2 to 15 wt % | of urea, whose amino groups are optionally linked to an ethylene or propylene bridge, | based, in each case, on the substantially water-insoluble material forming the core of the capsule.

Particular preference is given to microcapsules comprising from 7 to 20 wt % of melamine-formaldehyde resin and/or the methyl ethers thereof and from 4 to 10 wt % and in particular from 5 to 8 wt % of urea, whose amino groups are optionally linked to an ethylene or propylene bridge, based, in each case, on the material forming the core of the capsule. Microcapsules comprising from 7 to 15 wt % and in particular from 7 to 10 wt % of melamine-formaldehyde resin and/or the methyl ethers thereof and from 4 to 10 wt % and in particular from 5 to 8 wt % of urea, whose amino groups are optionally linked to an ethylene or propylene bridge, based, in each case, on the material forming the core of the capsule, are most preferred.

The novel microcapsules produced by the process of the invention are distinguished by a high degree of impermeability and uniformity of size.

The invention is illustrated below with reference to the following examples:

Measuring procedures used

I) Measurements of formaldehyde in dispersions of microcapsules according to DIN 16,746

The formaldehyde present in dissolved form in the finished (cured) dispersion was determined by this measuring technique. It is based on the reaction of sodium sulfite solution with formaldehyde and back-titration with iodine solution. The percentage content of formaldehyde is based on the total weight of the dispersion of microcapsules.

IIa) Measurements of the formaldehyde emitted during manufacture (Draeger tube readings)

The air above the reaction vessel was tested for formaldehyde by means of Draeger detecting tubes 8,101,751 according to Draeger Instructions No. 234-8,101,751. The measurable range of the tubes is from 2 to 40 ppm for over 5 pump strokes.

IIb) Measurements of the formaldehyde emitted during manufacture (readings obtained by the acetylacetone method)

Following capsule formation, the dispersions were passed from a cylindrical, vigorously stirred vessel to a closed vessel equipped with an anchor mixer. This vessel was connected to two water filled gas wash bottles, through which a slow draught of air was passed. The formaldehyde that was liberated during the heating and curing operation was entrained to the gas wash bottle by the draught of air, where it dissolved in the water. Determination of the formaldehyde content was carried out photometrically by the acetylacetone method.

III) Measurements of the formaldehyde emitted during subsequent processing by the converter method 8.25 g of a 40 wt % strength (or 6.6 g of a 50 wt % strength) capsule dispersion were applied to a coated base paper together with 9.75 g of water and 1.3 g of a 50 wt % strength commercial binding agent dispersion based on a copolymer of styrene and butyl acrylate (Acronal® S 320 D). Following evaporation of the water the coating contained 84% of capsules and 16% of binding agent. The freshly coated paper was dried over a period of 15 min in an oven at 105° C. using a constant stream of air. This stream of air was passed through gas wash bottles, and the resulting formaldehyde was determined photometrically by the acetylacetone method. The percentages relate to the content of formaldehyde based on the weight of the coating (solid matter=microcapsules+binding agent).

IV) Measurements of the formaldehyde concentration in the paper, as determined by DIN EN 1541

A paper coated with a coating composition obtained by thoroughly homogenizing 8.75 g of water, 8.25 g of a dispersion of microcapsules, 1.30 g of a chemigroundwood (Arbocel® BSM 55) acting as spacer and 1.30 g of a 50 wt % strength commercial binding agent dispersion based on a copolymer of styrene and butyl acrylate (Acronal® S 320 D), (ca 5 g/m$^2$) was chopped up as specified in DIN EN 645 and a cold water leachate was made. The formaldehyde in the filtrate was determined photometrically with acetylacetone according to DIN 1541.

V) Determination of the impermeability of a dispersion of microcapsules (test on CF paper)

The dispersion of microcapsules was diluted with water in a ratio of 1:1 and applied to the CF layer of a standard CF paper with an Erichson film applicator. The paper was dried at room temperature over a period of 30 min. It was then examined with a magnifying glass for specks of color derived from free kernel oil and forming a measure of the impermeability. The results were graded as follows:

1=uniform marked discoloration

2=uniform discoloration

3=many color specks

4=a few color specks

5=no color specks

VI) Determination of the impermeability of a dispersion of microcapsules (spray test)

The dispersion of microcapsules was diluted with water in a ratio of 1:1 and applied to the CF layer of a standard CF paper with an Erichson film applicator (slit width 30 μm). The paper was dried at room temperature over a period of 30 min. It was then uniformly but not heavily sprayed with color former solvent from a spray can. Following storage over a period of 2 h away from direct sunlight the resulting discoloration was measured with a reflection photometer (ELREPHO®, sold by Zeiss) (standard color value Y) and compared with untreated CF paper. The lower the numerical value of the coloration, the greater the impermeability of the capsules.

VII) Determination of the intensity of the copied text on a paper coated with a microcapsule coating composition Using a coating composition obtained by thoroughly homogenizing 8.75 g of water, 8.25 g of a dispersion of microcapsules, 1.30 g of a chemigroundwood (Arbocel® BSM 55) acting as spacer and 1.30 g of a 50 wt % strength commercial binding agent dispersion based on a copolymer of styrene and butyl acrylate (Acronal S 320 D), a coated base paper weighing 50 g/m$^2$ was coated by means of a wire-wound doctor having a slit width of 24 μm in an automatic coating device in such a manner that the coating had a weight of ca 8 g/m$^2$ 30 min after the coating operation and drying in air (CB paper, "coated back paper"). From the CB paper, a standard phenol CF paper ("coated front paper") and also an uncoated paper corresponding to standard base paper there were cut test pieces of identical size and having a minimum size of 70×60 mm.

A sample of the test CB paper was placed coated side down on a piece of standard CF paper coated side up. This was then covered by two pieces of uncoated standard paper. This sandwich was loaded into an electric typewriter such that the back of the standard CF paper rested on the typewriter platen. The typing pressure of the typewriter was set to 3 and the letter "w" was typed over an area of ca 50×50 mm. The typed paper was then stored for a period of 30 min in the dark.

The reflectance RY of the "w" area of the treated paper and that of an untreated CF paper were then measured with a reflection photometer (ELREPHO, Zeiss). The difference is given as the IG value. In each test a standard substance (100% of melamine/formaldehyde resin content, no urea) was co-tested. The table shows the differences in IG value relatively to the standard (negative values indicate that a less intense copy is obtained than with the standard whilst positive values show that a more intense copy is achieved than with the standard).

VIII) Determination of the coefficient of friction of a paper coated with a microcapsule coating composition a) A sample of the test CB paper was attached coated side up to a piece of synthetic leather. A piece of standard CF paper was then placed thereon coated side up. A friction tester was then placed near the edge of the CF paper and weighted by four weights. The resulting specific load was 2.1 N/cm$^2$. The weighted CF paper with friction tester was then slowly drawn over the entire length (22 cm) of the CB paper by hand. For this test, the entire felted surface of the tester must rest on the paper. The thus treated CF paper was stored over a period of 30 min in the dark.

The reflectance RY of the treated paper and that of an untreated paper were measured. In each test a standard substance (100% of melamine/formaldehyde resin content, no urea) was co-tested. The table gives the differences in IG value compared with the standard substance (negative values=less sensitive to friction than the standard, positive values=more sensitive to friction than the standard).

IX) Solids content

The solids content stated in the examples was determined by drying (1 h at 105° C.) and is substantially composed of the microcapsules and the water-soluble polymer. The capsule sizes were determined subjectively under the microscope and objectively by means of a Malvern Sizer. The capsule sizes are given in $\mu$m as D(50) value (50% of the integral curve).

The viscosity of the capsule dispersion is given as the outflow time in seconds of a dispersion leaving a DIN cup having a 4 mm orifice (DIN 53,211). The viscosity of the 20 wt % strength solutions of the water-soluble polymers containing strongly acid groups such as sulfo groups was measured at 23° C. with a Brookfield viscosimeter RVT, Spindle No. 3, at 50 rpm. The K value was determined according to Fikentscher (Cellulosechemie 13 (1932) 58 et seq), conc. 0.5% in water.

General instructions for the preparation of dispersions of microcapsules

A) Preparation of the color former solution

In a glass beaker or receiving flask there were placed 385 g of a solvent mixture comprising 80 wt % of diisopropylnaphthalene (KMC oil of RKS) and 20 wt % of a diluent (Shellsol D 100) as initial batch, which was stirred. To this mixture there were added 15 g of a blue-writing color former mixture (Pergascript® blue I-2RN, Pergascript blue SrB and Pergascript red I-6B, sold by Ciba) and the mixture was heated to ca 105° C. with stirring. The clear solution was kept at ca 100° C. for a further 45 min.

A black-writing color former solution was prepared according to the above instructions using the following starting materials: 380 g of a solvent mixture of 70 wt % of diisopropylnaphthalene (KMC oil) and 30 wt % of a diluent (Shellsol D 100) and 20 g of a black-copying color former mixture (eg Pergascript blue I-2RN, Pergascript green I-2GN, Pergascript black I-R and Pergascript red I-6B).

Melamine-formaldehyde resin

In all experiments, a 70 wt % strength aqueous solution of a partially etherified methylolated melamine-formaldehyde resin was used as the starting resin. This resin had a ratio of 1 mol of melamine to 5.7 mol of formaldehyde and a degree of methylation of 3.7.

B1) Preparation of a 40 wt % strength dispersion

Into a cylindrical stirred vessel having a capacity of 2 L and equipped with a high-performance disperser there were fed, with gentle stirring, 580 g of water, 80 g of a 20 wt % strength aqueous solution of a polymer of 2-acrylamido-2-methylpropanesulfonate (Na salt) (viscosity: 1000 mpa•s, K value: 155), 86 g of a 70% strength aqueous solution of the melamine-formaldehyde resin and the respective amount of urea. The dispersion was adjusted to a 40 wt % solids content by dilution depending on the concentration of urea.

The speed of rotation of the dissolver was then raised so as to achieve thorough mixing. Whilst continuing mixing there were slowly added 400 g of color former solution. The temperature was kept at from 28° to 30° C. and the dissolver speed at 6000 rpm. 16 g of 10 wt % strength formic acid were then added to give a pH of from 3.6 to 3.8. Capsules formed after approximately 35 to 45 min. When the desired size of the capsules had been achieved, the speed of rotation of the dissolver was reduced to 2000 rpm and the dispersion of capsules stirred for another hour at from 28° to 30° C. and 2000 rpm.

To effect curing, the capsule dispersion was heated to 75° C. and, when this temperature had been reached, kept at 75° C. for another two hours. On conclusion of the curing time, the batch was cooled to approximately 40° C. and neutralized by the addition of 6 g of NaOH (50 wt % strength) or 14.2 g of diethanolamine (80% strength).

B2) Preparation of a 50 wt % strength dispersion

In a cylindrical stirred vessel having a capacity of 2L and equipped with a high-performance disperser there were fed, with gentle stirring, 400 g of water, 100 g of a 20 wt % strength aqueous solution of a copolymer of acrylamidomethylpropanesulfonate, methyl acrylate, acrylic acid and styrene, 110 g of a 70 wt % strength aqueous solution of the melamine-formaldehyde resin and the respective amount of urea. The dispersion was adjusted to a 50 wt % strength solids content by dilution depending on the concentration of urea.

The speed of rotation of the dissolver was then raised so as to achieve thorough mixing. Whilst continuing mixing there were slowly added 500 g of color former solution. The temperature was kept at from 28° to 30° C. and the dissolver speed at 6000 rpm. 16 g of 10 wt % strength formic acid were then added to give a pH of from 3.6 to 3.8. Capsules formed after approximately 35 to 45 min. When the desired size of the capsules had been achieved, the speed of rotation of the dissolver was reduced to 2000 rpm and the dispersion of capsules stirred for another hour at from 28° to 30° C. and 2000 rpm.

To effect curing, the capsule dispersion was heated to 75° C. and, when this temperature had been reached, kept at 75° C. for another two hours. On conclusion of the curing time, the batch was cooled to approximately 40° C. and neutralized by the addition of 6.5 g of NaOH (50 wt % strength) or 17.2 g of diethanolamine (80% strength).

B3) Preparation of a 50 wt % strength dispersion

The procedure described under B2 was repeated except that the formation of microcapsules was carried out at 45° C. This procedure deviated from the aforementioned process in that 500 g of the hot color former solution were slowly added so as to give a mixing temperature of from ca 40° to 45° C. 28 g of 10 wt % strength formic acid were added at an encapsulating temperature of from 44° to 46° C. and a dissolver speed of 6000 rpm. The speed of rotation of the dissolver was then reduced to 3500 rpm. Encapsulation was complete after 30 minutes.

The mixture was then heated to 75° C. and when the curing temperature had been reached, the speed of rotation was reduced to 2000 rpm. The temperature was kept at 75° C. for a period of two hours. On completion of the curing time the batch was cooled to approximately 40° C. and neutralized by the addition of 6.5 g of sodium hydroxide solution (50 wt % strength) or 17.2 g of diethanolamine (80 wt % strength).

Both 40 wt % strength and 50 wt % strength capsule dispersions were prepared by various processes. Also, both blue- and black-writing capsules were tested. The contents of the capsules have no influence on the formaldehyde concentration. The process proposed for the reduction of the formaldehyde content can also be carried out with all of the processes mentioned.

EXAMPLES 1 to 10 (process of the invention)

For Examples 1 to 10 there were prepared 50 wt % strength capsule dispersions containing blue color formers according to instructions B2 and B3. The quantity x of melamine resin was varied; 110 g of a 70 wt % strength resin solution were taken to be 100% and the amount was then reduced down to 60%. The addition of urea was varied from 1 to 4 wt % based on the total amount of the dispersion (from 12 to 48 g of urea).

All dispersions were then neutralized with sodium hydroxide solution (pH ca 9 to 10).

EXAMPLE C1

A 50 wt % strength capsule dispersion was prepared in a manner similar to that described in Examples 1 to 10 but without the addition of urea.

The process parameters and performance results are listed in Table 1 below:

TABLE 1

| Ex. | x [%] | y [%] | T [° C.] | I) [%] | III) [%] | VI) IG | D (50) [μm] | VII) IG | VIII) IG |
|---|---|---|---|---|---|---|---|---|---|
| 1 | 100 | 3.0 | 45 | 0.24 |  | 1.8 | 5.6 | −3.9 | −6.6 |
| 2 | 90 | 1.0 | 45 | 0.79 |  | 1.0 | 4.4 | −2.6 | −3.4 |
| 3 | 80 | 2.0 | 45 | 0.21 | 0.49 | 1.8 | 5.1 | −2.2 | −2.2 |
| 4 | 70 | 4.0 | 30 | 0.01 | 0.13 | 1.3 | 4.9 | −2.3 | −4.0 |
| 5 | 70 | 3.0 | 30 | 0.04 | 0.06 | 2.1 | 6.3 | 1.3 | 0.0 |
| 6 | 70 | 3.0 | 50 | 0.03 |  | 1.1 | 5.6 | −1.5 | −3.4 |
| 7 | 70 | 2.6 | 30 | 0.08 | 0.27 | 1.5 | 6.1 | −0.4 | −0.6 |
| 8 | 60 | 3.0 | 30 | 0.01 | 0.04 | 1.5 | 5.6 | 1.8 | −2.6 |
| 9 | 65 | 2.6 | 45 | 0.07 |  | 1.9 | 6.3 | 0.1 | −1.1 |
| 10[a)] | 60 | 3.0 | 45 | 0.02 | 0.06 | 1.8 | 4.4 | −0.6 | −2.7 |
| 11 | 55 | 2.3 | 45 |  |  | 1.2 | 7.4 | 2.7 | 1.0 |
| 12 | 50 | 2.0 | 45 |  |  | 3.2 | 7.2 | 4.9 | 2.5 |
| C1 | 70 | 0 | 45 | 0.98 |  | 3.4 | 5.5 | 4.5 | 9.9 |

[a)]only 80 g of the 20 wt % strength protective colloid dispersion were used
x = x % of 110 g of melamine/formaldehyde resin solution (70 wt % strength)
y = y wt % of urea based on the total dispersion
I) formaldehyde content of the dispersion as measured according to DIN 16,746
III) formaldehyde emission at 105° C.
VI) spray test (impermeability of the microcapsules)
VII) intensity of the copied text
VIII) coefficient of friction All of the dispersions scored grade 5 in the impermeability test on CF paper. The negative values for intensity VII) and coefficient of friction VIII) of the capsules of Example 1 show that the shell of the capsule is thicker than in the case of standard encapsulation (100% melamine resin, no urea), which is the cause of their greater strength/impermeability. By reducing the amount of resin there were obtained novel microcapsules having improved properties. In the process of the invention it is possible to lower the amount of resin down to 50% of the standard amount resulting in better dispersions containing less formaldehyde with no reduction in impermeability. The values show that the reduction of the amount of resin to from 55 to 60 wt % approximately corresponds to the shell thickness of the standard capsules. Without the addition of urea according to the invention reduction of the quantity of melamine resin causes permeable capsules that are more sensitive to friction.

EXAMPLES 13, 14, C2 and C3

There were prepared 40 wt % strength capsule dispersions with blue color formers according to process instructions B1, where the amount of resin was reduced (56 g of a 70 wt % strength=65% of the standard amount). The addition of urea was varied with respect to the total weight of the dispersion. The dispersions were then neutralized with sodium hydroxide solution (pH ca 9 bis 10).

The process parameters and results are listed in Table 2 below:

TABLE 2

| Ex. | x [%] | y [%] | T ° C. | I) [%] | IV) [ppm] | VI) IG | D (50) [μm] | VII) IG | VIII) IG |
|---|---|---|---|---|---|---|---|---|---|
| 13 | 65 | 3.0 | 30 | 0.02 |  | 1.6 | 5.7 | 1.7 | −1.3 |
| 14 | 65 | 2.6 | 30 | 0.06 | 90 | 1.5 | 4.5 | 0.7 | 0.7 |
| C2 | 65 | 0 | 45 | 0.87 | 270 | 1.8 | 5.2 | 5.0 | 5.3 |
| C3 | 65 | 0 | 45 | 0.87 |  | 1.5 | 5.4 | 4.6 | 10.7 | x = x % of 86 g of melamine/formaldehyde resin solution (70 wt % strength)
y = y wt % of urea based on total dispersion
I) formaldehyde content according to DIN 16,746
IV) formaldehyde content of coated papers as determined by DIN EN 1541
VI) spray test (impermeability of the microcapsules)
VII) intensity of the copied text
VIII) coefficient of friction

EXAMPLES 15 to 19 and C4 to C9

There follows a comparison of the formaldehyde contents of microcapsules having similar shell thicknesses. The microcapsules of Examples 15 to 19, C4 and C5 were prepared according to the general manufacturing processes but with reduction of the amount of resin (based on 100% of the amount of resin stated in the general manufacturing instructions). In the comparative examples microcapsules having 65 and 100% resin were prepared.

All dispersions were then neutralized with NaOH (pH 9 to 10).

The urea was added at different stages:

| Example 3 | addition of urea following the capsule formation at 45° C. prior to curing |
| Example C4 | addition at an acid pH following curing at 30° C. |
| Example C5 | no addition of urea |
| Example C6 | addition at an acid pH at 75° C. just prior to cooling |
| Example C7 | addition of urea following curing at a pH of 9–11 |
| Example C8 | addition of urea following curing at pH 9–11 |
| Example C9 | addition of ethylene urea following curing at pH 9–11 |

TABLE 3

| Ex. | H | x [%] | y [%] | z [%] | T °C. | I) [%] | IV) [ppm] | VI) IG | $D_{(50)}$ $\mu$ | VII) IG | VIII) IG |
|---|---|---|---|---|---|---|---|---|---|---|---|
| 15 | B3 | 65 | 2.6 | 0 | 45 | 0.06 | 70 | 2.0 | 5.2 | 0.5 | −3.6 |
| 16 | B3 | 65 | 3.0 | 0 | 45 | 0.03 |    | 2.5 | 5.9 | 0.1 | −2.3 |
| 17 | B3 | 65 | 2.6 | 0 | 45 | 0.07 | 50 | 1.9 | 6.3 | 0.1 | 0.3 |
| 18 | B2 | 65 | 2.6 | 0 | 30 | 0.07 | 80 | 2.7 | 6.7 | 1.7 | 2.8 |
| 19 | B2 | 60 | 2.6 | 0 | 30 | 0.03 | 50 | 1.4 | 4.9 | 0.8 | −1.2 |
| V4 | B3 | 65 | 0 | 2.6 | 45 | 0.09 | 250 | 4.5 | 5.3 | 3.3 | 1.7 |
| V5 | B3 | 65 | 0 | 0 | 45 | 0.87 | 270 | 1.8 | 5.2 | 5.0 | 5.3 |
| V6 | B1 | 100 | 0 | 4.0 | 30 | 0.04 | 310 | 3.9 | 5.9 | 0.1 | 6.1 |
| V7 | B1 | 100 | 0 | 4.0 | 30 | 0.07 | 340 |   |   |   |   |
| V8 | B3 | 100 | 0 | 3.0 | 45 | 0.13 | 680 |   | 5.7 | 1.3 | −2.7 |
| C9[b)] | B3 | 100 | 0 | 3.0 | 45 | 0.07 | 260 |   | 5.7 | 1.4 | −2.2 |

[b)]instead of urea imidazolidin-2-one was used
H = manufacturing process
x = x % von 110 g or 86 g (C5, C6) melamine-formaldehyde resin solution (70 wt % strength dispersion)
y = y wt % of urea based on the total dispersion
z = urea added during or after curing
I) formaldehyde content of the microcapsule dispersion according to DIN 16746
IV) formaldehyde content of coated papers as determined by DIN EN 1541
VI) spray test impermeability of the microcapsules)
VII) intensity of the copied text
VIII) coefficient of friction The results show that only the addition of urea according to the invention leads to novel capsules having a reduced formaldehyde content both in the dispersion of microcapsules and in the paper itself.

EXAMPLES C10 to C12

In the manner specified by the manufacturing instructions B1, B2 and B3 there were prepared 40 and 50 wt % strength capsule dispersions to which no urea was added prior to the curing step. The dispersions were then neutralized with sodium hydroxide solution (pH 10).

TABLE 4

| Ex. | x [%] | FG [%] | T °C. | I) [%] | IV) [ppm] | VI) IG | D (50) $\mu$m | VII) IG | VIII) IG |
|---|---|---|---|---|---|---|---|---|---|
| C10 | 100 | 39.9 | 30 | 1.06 | 160 | 3.6 |   |   |   |
| C11 | 100 | 50.0 | 45 | 1.24 |   |   |   |   |   |
| C12[a)] | 100 | 43.3 | 30 | 1.12 | 190 | 3.9 | 5.9 | −1.4 | −2.2 |

[a)]40 wt % strength dispersion of microcapsules
x = x % of 110 g of melamine/formaldehyde resin solution (70 wt % strength)
FG = solids content of the dispersion
I) formaldehyde content according to DIN 16,746
IV) formaldehyde content of coated papers as determined by DIN EN 1541
VI) spray test (impermeability of the microcapsules)
VII) intensity of the copied text
VIII) coefficient of friction EXAMPLES 20, 21 (illustrating the invention) and C13, C14 (for comparison)

Formaldehyde Emission During Curing 50 wt % strength capsule dispersions were prepared according to manufacturing instructions B3. In Examples 20 and 21×g of urea were added prior to the dispersing step, and the amount of precondensate was reduced. No urea was added in Examples C13 and C14.

a) Using Draeger detector tubes, the gas space above the reaction vessel was examined. During the period of heating up to the curing temperature, the formaldehyde concentration of the gas space was determined. The detector tubes used are calibrated to 5 strokes and only then indicate the true concentration. However, since the measuring limit of the tubes was reached at 40 ppm, fewer strokes were used in order to achieve adequate comparability.

TABLE 5

| Ex. | x [%] | y [%] | 60° C. 3 strokes [ppm] | 64° C. 2 strokes [ppm] | 66° C. 1 stroke [ppm] | 70° C. 1 stroke [ppm] |
|---|---|---|---|---|---|---|
| 20 | 65 | 2.6 | 15 | 10 | 5 | 20 |
| C13 | 100 | 0 | >40 | >40 | 40 | >40 | x = x % of 86 g of melamine/formaldehyde resin solution (70 wt % strength)
y = y wt % of urea based on the total dispersion b) Using the acetylacetone method described in instructions IIb) there was measured the total amount of formaldehyde emitted during heat-up and curing.

TABLE 6

| Example | x [%] | y [%] | II) [%] |
|---|---|---|---|
| 21 | 65 | 2.6 | <0.001% / <0.0001% |
| C14 | 100 | 0 | 0.69% / 0.07% | x = x % of 86 g of melamine/formaldehyde resin solution (70 wt % strength)
y = y wt % of urea based on the total dispersion
II) measurement by the acetylacetone method (1st gas wash bottle/2nd gas wash bottle), formaldehyde in % based on the total dispersion, in 250 mL After-treatment of the Dispersion of Microcapsules EXAMPLES 22 to 24

Following the general manufacturing instructions B3, dispersions of microcapsules were made, which were additionally treated, following curing, with 3 wt % of urea or imidazolidin-2-one and were basified with sodium hydroxide solution to pH 10.

EXAMPLES C15 to C19

Using the general manufacturing instructions B1 dispersions of microcapsules were made, to which no urea was added. Instead, the dispersion was set to a neutral to alkaline pH, after curing, by the addition of ammonia and/or diethanolamine or sodium hydroxide solution.

TABLE 7

| Ex. | H | x [%] | y [%] | Amine | pH | I) [%] | IV) [ppm] | $D_{(50)}$ [μm] | VII) IG | VIII) IG |
|---|---|---|---|---|---|---|---|---|---|---|
| 22 | B3 | 65 | 2.6 | — | | 0.08 | 70 | 5.7 | 0.0 | −4.7 |
| 23 | B3 | 65 | 2.6 | urea | | 0.02 | 120 | 5.7 | 0.3 | −4.2 |
| 24 | B3 | 65 | 2.6 | imidazol-idin-2-one | | 0.01 | 60 | 5.7 | 0.2 | −4.3 |
| C15 | B1 | 100 | 0 | $NH_3$ | 8.2 | 0.08 | 250 | | | |
| C16 | B1 | 100 | 0 | $NH_3$ | 9.1 | 0.01 | 240 | | | |
| C17 | B1 | 100 | 0 | $NH_3$ | 10.0 | 0.01 | 250 | | | |
| C18 | B1 | 100 | 0 | diethanol-amine/$NH_3$[1)] | 9.4 | 0.08 | 320 | | | |
| C19 | B1 | 100 | 0 | NaOH | 12.0 | 1.06 | 160 | | | |

H = manufacturing instructions
[1)]17.2 g of diethanolamine (80 wt % strength) and 24 g of aqueous ammonia (25 wt % strength)
x = x % of 110 g of melamine/formaldehyde resin solution (70 wt % strength)
y = y wt % of urea based on the total dispersion
I) formaldehyde content of the dispersion of microcapsules according to DIN 16,746
IV) formaldehyde content of the coated papers as determined by DIN EN 1541
VII) intensity of the copied text
VIII) coefficient of friction

EXAMPLE C20

The process described in EP-A 0,383,558, Example 33, page 25, line 54 et seq was carried out, the protective colloid used comprising 132.5 g of a 20 wt % strength aqueous solution of a copolymer of acrylamidomethyl-propanesulfonate, methyl acrylate, vinyl-unsaturated acid (acrylic acid) and styrene. The core material used for the capsules comprised 132.5 g of a 5 wt % strength color former solution. Following the addition of 77.1 g of melamine/formaldehyde resin solution the mixture had a pH of 5.5. After a period of 15 min, the mixture became very viscous, so that 150 mL water were added. Prior to the addition of urea solution the free formaldehyde in the dispersion was found to be equal to 0.2%. Following the addition of urea solution the pH was adjusted to 3.5 and curing was carried out over 1 h at 60° C. The dispersion was then cooled and the pH set to 6.5. The formaldehyde content was then 0.03%. The capsules were not stable after curing and a chromatoplate immediately became discolored.

EXAMPLE C21

EXAMPLE C20 was Repeated, Using Modified Proportions
melamine-formaldehyde resin solution:150 g
protective colloid: 40 g
kernel oil: 200 g
water: 200 g
urea solution 40 wt % strength: 33 g Here again the microcapsules obtained by this method were not stable and a chromatoplate immediately showed discoloration. The formaldehyde content was 0.2% prior to the addition of urea and 0.01% in the finished product, that is to say, the values are much the same as in the previous test.

We claim:

1. A process for the preparation of microcapsules comprising:
    condensing a melamine-formaldehyde resin and/or the methyl ethers thereof in a water dispersion of a substantially water-insoluble material forming the core of the microcapsules, in the presence of an anionic protective colloid and urea whose amino groups are optionally linked to an ethylene or propylene group, at a pH of from 3 to 6.5 and at temperatures of from 20° to 50° C., thereby forming the microcapsules; and
    curing the shell of the microcapsules at from >50° to 100° C.,
    wherein said urea is present in an amount of from 10 to 200 wt % prior to curing, based on the melamine-formaldehyde resin.

2. A process as defined in claim 1, wherein from 50 to 150 wt %, based on the amount of resin, of urea, whose amino groups are optionally linked to an ethylene or propylene bridge, are added prior to curing.

3. A process as defined in claim 1, wherein the anionic protective colloid is a sulfo group-containing homopolymer or copolymer.

4. A process as defined in claim 1, wherein the anionic protective colloid is a homopolymer or copolymer of 2-acrylamido-2-methylpropanesulfonic acid, sulfoethyl or sulfopropyl (meth)acrylate or vinylsulfonic acid.

5. A process as defined in claim 1, wherein the melamine-formaldehyde resin used comprises reaction products of melamine with formaldehyde in a molar ratio of from 1:3 to 1:6, the reaction products being optionally etherified with methanol.

6. A process as defined in claim 1, wherein the preparation of the microcapsules is carried out at pH's of from 3 to 5.

7. A process as defined in any of claims 1 to 6, wherein use is made of

| | |
|---|---|
| 7 to 20 wt % | of melainine-formaldehyde resin and/or the methyl ethers thereof and |
| 2 to 15 wt % | of urea whose amino groups are optionally linked to an ethylene or propylene bridge, | based, in each case, on the material forming the core of the capsule.

8. Microcapsules made by a process comprising:
    condensing a melamine-formaldehyde resin and/or the methyl ethers thereof in a water dispersion of a substantially water-insoluble material forming the core of the microcapsules, in the presence of an anionic protective colloid and urea whose amino groups are optionally linked to an ethylene or propylene group, at a pH of from 3 to 6.5 and at temperatures of from 20° to 50° C., thereby forming the microcapsules; and curing the shell of the microcapsules at from >50° to 100° C., wherein said urea is present in an amount of from 10 to 200 wt % prior to curing, based on the melamine-formaldehyde resin.

9. A dispersion comprising the microcapsules of claim 8.

10. Paper coated with a coating comprising the microcapsules of claim 8.

11. Pressure-sensitive recording systems comprising the microcapsules of claim 8.

* * * * *